(12) United States Patent
Yuasa et al.

(10) Patent No.: US 7,127,086 B2
(45) Date of Patent: Oct. 24, 2006

(54) IMAGE PROCESSING APPARATUS AND METHOD

(75) Inventors: Mayumi Yuasa, Hyogo-ken (JP); Kaoru Suzuki, Osaka-fu (JP); Kazuhiro Fukui, Hyogo-ken (JP); Osamu Yamaguchi, Hyogo-ken (JP); Tomokazu Wakasugi, Hyogo-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 637 days.

(21) Appl. No.: 10/648,323

(22) Filed: Aug. 27, 2003

(65) Prior Publication Data

US 2004/0042644 A1 Mar. 4, 2004

Related U.S. Application Data

(62) Division of application No. 09/522,597, filed on Mar. 10, 2000, now Pat. No. 6,690,814.

(30) Foreign Application Priority Data

Mar. 11, 1999 (JP) .............................. P11-065406

(51) Int. Cl.
*G06K 9/00* (2006.01)
*G06K 9/46* (2006.01)
*G06K 9/62* (2006.01)

(52) U.S. Cl. .............................. 382/118; 902/3; 902/5

(58) Field of Classification Search ................ 382/103, 382/115, 117, 118, 154, 190, 209, 218, 312, 382/318; 348/14.01, 47, 50, 159, 169; 351/206; 434/155; 902/3–6, 25–29
See application file for complete search history.

(56) References Cited

U.S. PATENT DOCUMENTS 4,754,487 A 6/1988 Newmuis
5,134,472 A 7/1992 Abe
5,293,427 A 3/1994 Ueno et al.
5,541,585 A 7/1996 Duhame et al.
5,850,470 A 12/1998 Kung et al.
5,852,669 A 12/1998 Eleftheriadis et al.
5,859,921 A 1/1999 Suzuki
5,982,912 A 11/1999 Fukui et al.
6,108,437 A 8/2000 Lin
6,181,805 B1 1/2001 Koike et al.
6,246,779 B1 6/2001 Fukui et al.
6,330,523 B1 12/2001 Kacyra et al.
6,377,701 B1 * 4/2002 Ohki .......................... 382/154
6,718,050 B1 * 4/2004 Yamamoto ................. 382/117

FOREIGN PATENT DOCUMENTS

JP 9-251534 9/1997

* cited by examiner

*Primary Examiner*—Yon J. Couso
(74) *Attorney, Agent, or Firm*—Finnegan, Henderson, Farabow, Garrett & Dunner, L.L.P.

(57) ABSTRACT

An image processing apparatus. A camera inputs an image of a face of a person to be recognized. A recognition area detection section generates a difference image between the input image and a predetermined pattern, and detects a recognition area whose value is above a threshold from the input image. An input data generation section converts the recognition area to a predetermined input data. A similarity calculation section calculates a similarity by comparing the predetermined input data with a predetermined dictionary data. A view position of the camera is located lower than a position of the face of the person. A direction of the optical axis of the camera represents an angle of elevation from a horizontal direction.

7 Claims, 11 Drawing Sheets

FRONT DIRECTION

LEFT DIRECTION

RIGHT DIRECTION

UPPER DIRECTION

LOWER DIRECTION

IMAGE PROCESSING APPARATUS AND METHOD

This is a division of application Ser. No. 09/522,597, filed Mar. 10, 2000, now U.S. Pat. No. 6,690,814, and incorporated herein by reference.

FIELD OF THE INVENTION

The present invention relates to an image processing apparatus and a method to execute a predetermined processing for an input image including a face area of a person.

BACKGROUND OF THE INVENTION

In an image pattern recognition apparatus for recognizing a reflected intensity image of an object, an image captured by reflected light from object surface (the reflected intensity image) is input (image input processing). An image area as a recognition object is extracted from the input image (pattern extraction processing). The image area is converted to a pattern of predetermined size (pattern normalization processing). This pattern is converted to predetermined input data (feature extraction processing). This input data is compared with dictionary data previously registered and a similarity is calculated (similarity calculation processing).

In the pattern extraction processing, a background subtraction method, a temporal subtraction method, and a template matching method are selectively used. In the background subtraction method, a difference between an image not including a recognition object (background image) and an image including the recognition object (input image) is calculated, and an area of large difference value is extracted as an area including the recognition object. In the temporal subtraction method, a difference between two images inputted at different times is calculated, and an area of large difference value is extracted as an area including the recognition object detected by movement. In the template matching method, a template representing image feature of the recognition object is scanned on the input image, and an area of largest correlative value is extracted as an area including the recognition object. The background subtraction method and the temporal subtraction method are superior to the template matching method for quickly executing the pattern extraction processing.

In a similarity calculation processing, a distance evaluation method, a subspace method and a mutual subspace method are selectively used. In the distance evaluation method, input data and dictionary data are respectively represented as a vector of the same dimension and the same feature; a distance between both vectors is evaluated; and an object in the input data is recognized by evaluation. In the subspace method, the dictionary data is represented as a dictionary subspace generated from a plurality of vectors; a distance between the input vector and the dictionary subspace is evaluated; and the object in the input data is recognized by evaluation. In the mutual subspace method, the input data is also represented as an input subspace generated from a plurality of vectors; a distance between the input subspace and the dictionary subspace is evaluated; and the object in the input data is recognized by evaluation. In each method, a similarity between the input data and the dictionary data is converted to a similarity in order to recognize the object.

However, in the background difference method and the time difference method, the following two problems are well known.

(1) If a plurality of objects are included in the input image, the area of the recognition object is not extracted from the input image. As a result, by using the template matching method, each difference area must be verified based on image feature.

(2) If illumination environment changes because of weather variation or time passage, unexpected noise is mixed into the difference value. As a result, the area of the recognition object is not correctly extracted.

In order to solve these problems, it is necessary that th recognition object obtains high difference value in the difference image. Concretely speaking, the following two solution ideas are necessary.

(A) A camera means is controlled in order to capture the recognition object only in the input image.

(B) The difference value is calculated using an image representation not effected by illumination changes.

However, in the prior art, concrete means of two solution ideas (A) (B) are not considered as for above-mentioned two problems (1) (2). As a result, the image pattern recognition to quickly extract the recognition object using the difference is difficult.

Furthermore, in Japanese Patent Disclosure (Kokai) PH9-251534, a person recognition method is disclosed for a person's face as the recognition object. In this method, a pattern extraction processing by the template matching method is combined with a similarity calculation processing by the mutual subspace method. The pattern extraction, the pattern normalization, and the similarity calculation are stably executed for change of facial direction and expression. Especially, in order to extract facial parts such as pupils and nostrils, a separability filter strong in change of illumination is used. In this case, the pattern normalization is executed based on location of the facial parts so that the normalized pattern is not varied by change of facial direction or expression. In this method, the nostrils are used as the facial parts. Therefore, the camera (image input means) is located at lower part of a display to which a user faces in order to capture the nostrils of the user in the image. However, in this method, the following two problems exist.

(3) Concrete or detail condition for location of the camera is not disclosed. The detection of the facial parts is not assured if the camera is arbitrarily located.

(4) In order to stably detect the facial parts of the user from the input image, an idea to positively keep the user in such situation is not disclosed. As a result, the detection of the facial parts fails because of a caprice or whim of the user.

As mentioned-above, in the image pattern recognition method of the prior art, following two problems occur.

(1) A simple recognition object is not captured in the image. As a result, a pattern of the recognition object is not correctly extracted by the difference processing only.

(2) The noise area except for the recognition object is included in the difference value by noise cause such as illumination change. As a result, the pattern of the recognition object is not stably extracted by the difference processing only.

Furthermore, in the person identification method of the prior art, the following two problems occur.

(3) The location method of the camera means to assure the extraction of the facial parts is not apparent. As a result, a possibility to fail to extract the facial parts remains.

(4) A target means to lead the user to assure the extraction of the facial parts does not exist. As a result, the possibility to fail to extract the facial parts remains.

SUMMARY OF THE INVENTION

It is an object of the present invention to provide an image processing apparatus and a method to contrive the location of the camera means in order to simply execute the pattern extraction processing in image pattern recognition.

It is an object of the present invention to provide an image processing apparatus and a method to contrive the location of the camera means in order to simply execute the facial part extraction processing in person identification.

According to the present invention, there is provided an image processing apparatus, comprising: image input means for inputting an image of a face of a person to be recognized by using a camera; recognition area detection means for generating a difference image between the input image and a predetermined pattern and for detecting a recognition area whose value is above a threshold from the input image; input data generation means for converting the recognition area to a predetermined input data; and similarity calculation means for calculating a similarity by comparing the predetermined input data with a predetermined dictionary data; wherein a view position of the camera is located lower than a position of the face of the person, and a direction of optical axis of the camera represents an angle of elevation for a horizontal direction from the view position of the camera to the person.

Further in accordance with the present invention, there is also provided an image processing apparatus, comprising: image input means for inputting an image of a face of a person to be recognized by using a camera; face detection means for detecting a face area from the input image; facial part detection means for detecting a plurality of facial parts from the face area; and gaze direction detection means for detecting a gaze direction of the person from the plurality of facial parts; wherein a view position of the camera is located lower than a position of the face of the person, and a direction of optical axis of the camera represents an angle of elevation for a horizontal direction from the view position of the camera to the person.

Further in accordance with the present invention, there is also provided an image processing apparatus, comprising: image input means for inputting an image of a face of a person to be recognized by using a camera; face detection means for detecting a face area from the input image; facial part detection means for detecting a plurality of facial parts from the face area; person identification means for identifying the person by using a facial pattern consisted of the plurality of facial parts; and target means for leading at least one of a gaze direction and a facial position of the person to a predetermined direction or position; wherein a view position of the camera is located lower than a position of the face of the person, and a direction of optical axis of the camera represents an angle of elevation for a horizontal direction from the view position of the camera to the person.

Further in accordance with the present invention, there is also provided an image processing apparatus, comprising: first image input means for inputting a first image of a face of a person to be recognized by using a first camera; second image input means for inputting a second image of the face of the person by using a second camera; face detection means for detecting a face area from the first image; frontal face decision means for deciding whether the second image is a frontal face of the person by referring to the face area; open eyes detection means for detecting a state of open eyes from the face area; and image output means for outputting the second image inputted while the second image is decided to be the frontal face and the state of opening eyes is detected; wherein a direction from a view position of the second camera to a center position of the face of the person is a facial front direction, and wherein a view position of the first camera is located lower than a position of the face of the person, and a direction of optical axis of the first camera represents an angle of elevation for a horizontal direction from the view position of the first camera to the person.

DETAILED DESCRIPTION OF THE PREFERRED EMBODIMENT

Figure 1:
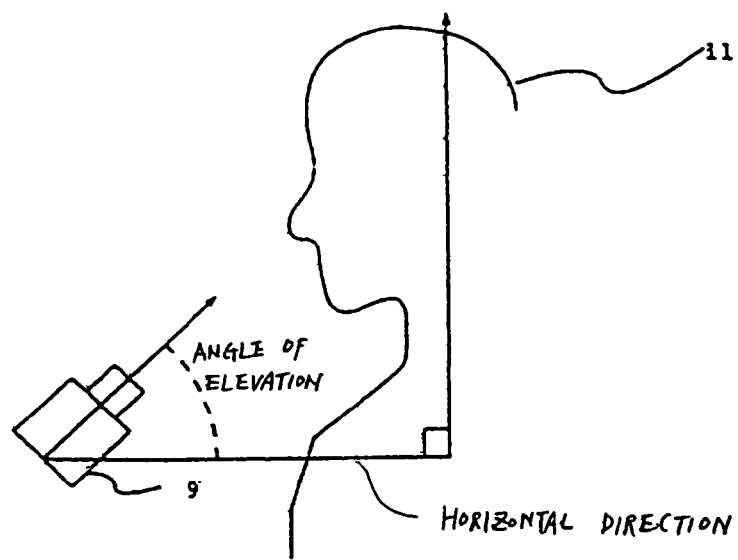
FIG. 1 is a schematic diagram of the embodiments of the present invention.
Figure 2:
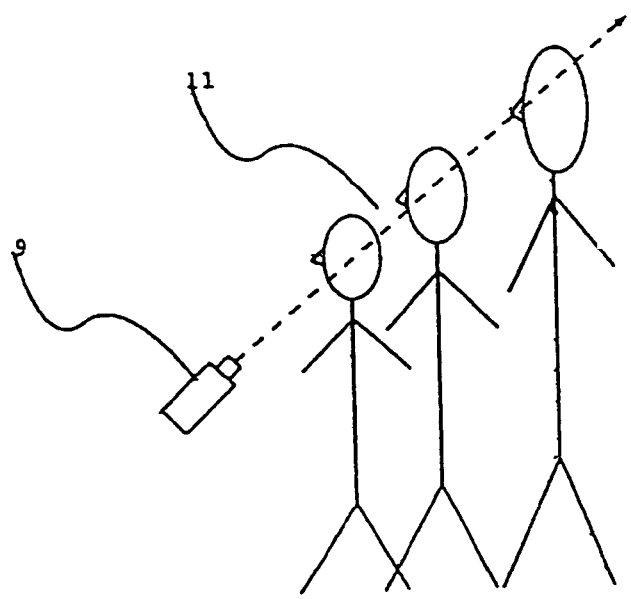
FIG. 2 is a schematic diagram showing the effect of the embodiments in FIG. 1.

First, a basic concept of the present invention is explained. The present invention is applied to an image input apparatus (camera means) for inputting a facial image of a plurality of unspecified or specified persons. FIG. 1 is a schematic diagram of the basic concept of the location of the camera means of the present invention. In FIG. 1, a view position of a TV camera 9 is located lower than a facial position of a person 11 to be recognized, and a direction of an optical axis of the TV camera 9 represents an angle of elevation from the horizontal direction from the camera position to the person. In this way, the direction of optical axis of TV camera is set along upper direction than the horizontal direction in order to capture the facial image of the person. Therefore, as shown in FIG. 2, even if facial images of object persons 11 whose stature are respectively different are input by the TV camera 9, the facial images of object persons 11 are certainly captured by the TV camera 9. This location of the camera means is basic structure of the embodiments explained afterwards.

Throughout this specification, horizontal refers to the direction perpendicular to vertical. While vertical is usually defined by a plumb line, vertical, as used in the specification, can also be defined by the posture or pose of the subject person.

Next, the image pattern recognition apparatus according to a first embodiment of the present invention is explained. In the first embodiment, an image including the recognition object is input; a difference image is generated from the input image; and a change area is detected from the difference image. Then, the change area is normalized; input data (parameter) is generated from the normalized image; and a similarity between the input data and a dictionary data registered is calculated. In this way, the normalized pattern is classified into a predetermined category. Especially, the image pattern recognition apparatus is applied to an equipment of a gate apparatus to manage visitors. Only one person can pass through the gate at one time. Therefore, the facial image of the person entering into the gate is recognized, and sex distinction and age of visitors are counted using the recognition result.

Figure 3:
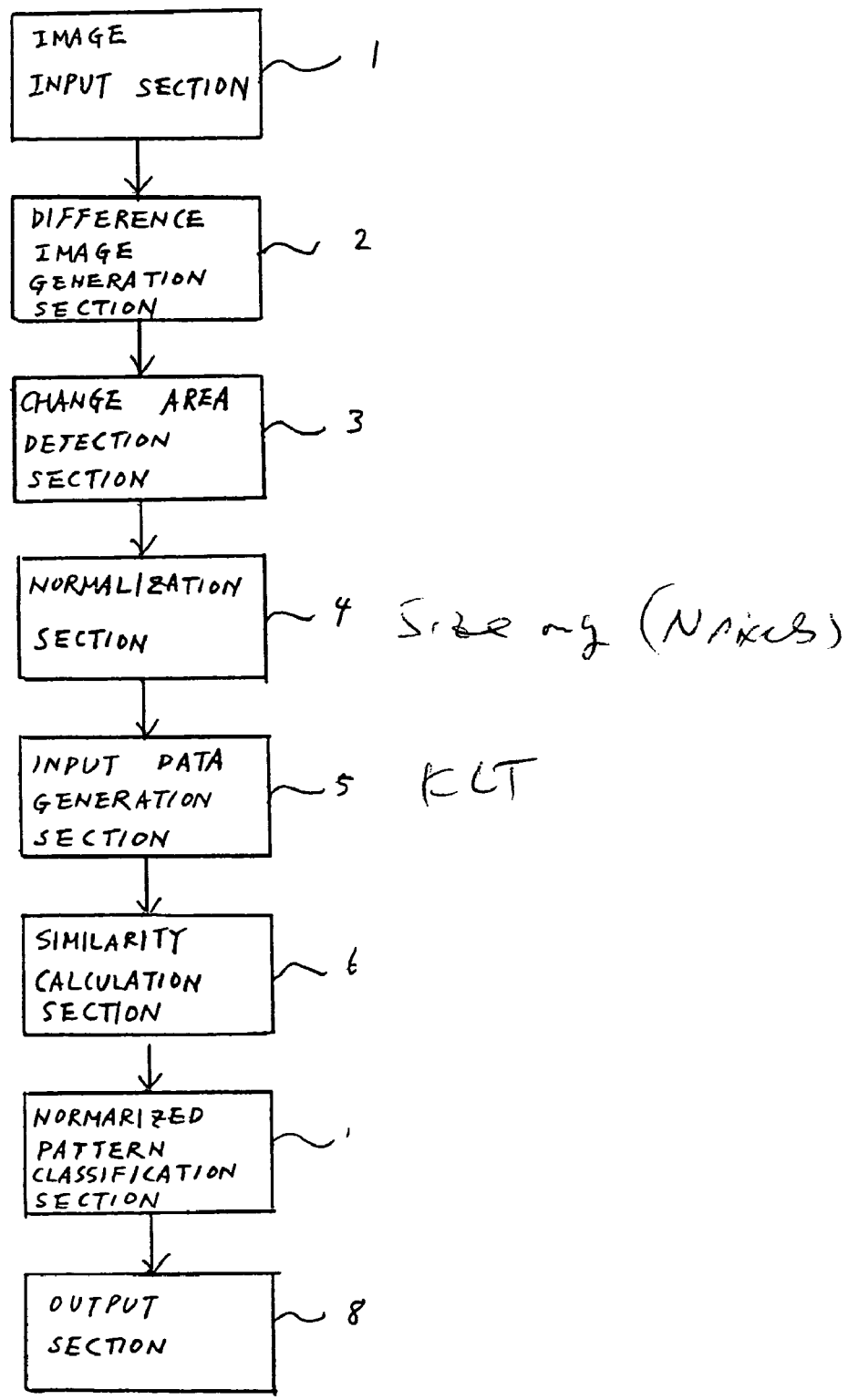
FIG. 3 is a block diagram of the image processing apparatus according to a first embodiment of the present invention.

FIG. 3. is a block diagram of the image pattern recognition apparatus according to the first embodiment. The image pattern recognition apparatus includes an image input section 1, a difference image generation section 2, a change area detection section 3, a normalization section 4, an input data generation section 5, a similarity calculation section 6, a normalized pattern classification section 7, and an output section 8.

Figure 4:
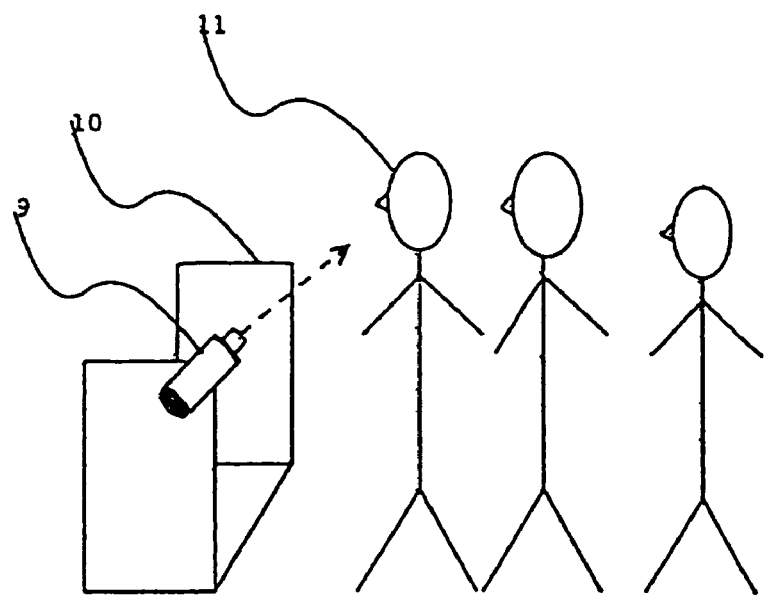
FIG. 4 is a schematic diagram showing the location of the camera in gate apparatus in the first embodiment.
Figure 5:
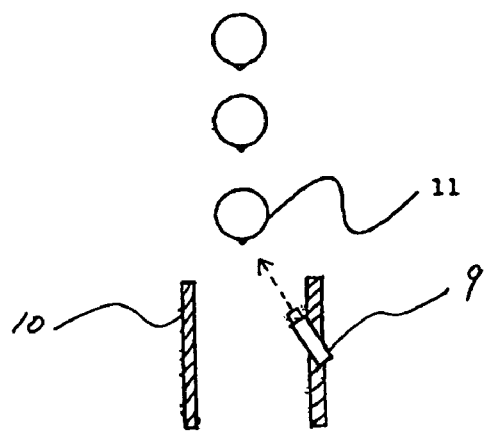
FIG. 5 is a schematic diagram of a plan view of the location of the camera in the gate apparatus in FIG. 4.
Figure 6A:
FIG. 6A is a schematic diagram of an example of input image including a face of one person according to the first embodiment.

The image input section 1 periodically inputs an image of reflected intensity. In this case, as shown in FIGS. 4 and 5, the TV camera 9 represents an angle of elevation in order to capture a facial image of a person 11 passing through the gate 10 from a slant lower position. As a result, the view of TV camera 9 includes a face of one person only. If no person is passing through the gate 10, the view of TV camera 9 includes a ceiling only. FIG. 6A shows an example of input image by the TV camera 9 located as shown in FIGS. 4 and 5. In FIG. 6A, an image including the ceiling only is regarded as a background image. Therefore, the facial image of the one person is extracted from the input image according to the background subtraction method. Alternatively, the facial image of the one person is extracted according to the temporal subtraction method.

Figure 6B:
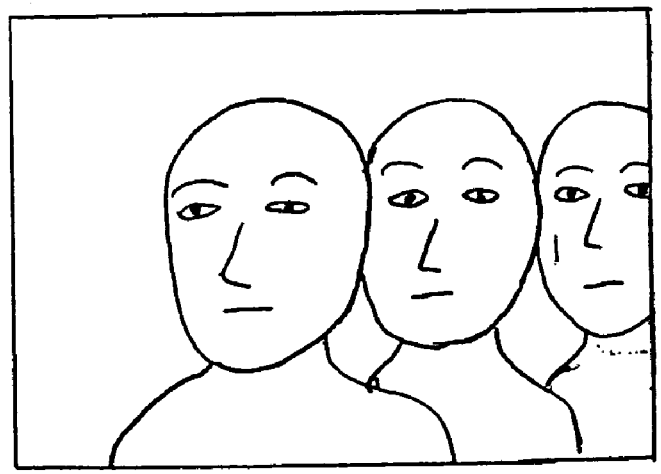
FIG. 6B is a schematic diagram of an example of input image including faces of a plurality of persons according to the prior art.

In the prior art, the TV camera 9 is located at frontal position against a facial position of visitors in the gate. FIG. 6B shows an example of input image by TV camera of the prior art. As shown in FIG. 6B, facial images of a plurality of visitors entering into the gate are included in the image. Therefore, in this case, a facial image of one person is not correctly extracted even if the background subtraction method or the temporal subtraction method is used.

The difference image generation section 2 calculates absolute value of difference of each pixel value between the input image and the background image (the ceiling image), and generates a difference image of which the absolute value is corresponding pixel value. The change area detection section 3 binalizes each pixel value of the difference image by a threshold, and extracts the pixels of large difference value. The pixels of large difference value represents the recognition object (visitor) in the view area. Therefore, one circumscribed rectangle including the pixels of large difference value is regarded as an area of the visitor into the gate, and inner area of the rectangle is extracted as the change area. In this case, the change area is not limited to the circumscribed rectangle, and may be general circumscribed figure.

In case of detecting the change area, the difference image generation section 2 may generate a temporal subtraction image between two images of which input timings are different. In short, by the location of TV camera 9 shown in FIGS. 4 and 5, only one person's area is extracted as the change area.

The normalization section 4 normalizes the change area detected by the change area detection section 3 as predetermined size and generates a normalized image consisting of N pixels.

The input data generation section 5 regards each normalized image as N-dimensional feature vector while the visitor is included in the view area and serially stores a predetermined number of the feature vectors. Then, the normalization section 4 calculates an eigenvector by KL-expansion of the feature vector and generates a subspace whose base vector is the eigenvector. In this way, the subspace is regarded as the input data.

The similarity calculation section 6 calculates a similarity between the subspace (input data) and a dictionary subspace of each classified category. This calculation is repeatedly executed as a number of classified category.

The normalized pattern classification section 7 selects one category of the dictionary subspace whose similarity is highest above a threshold. This selected category (personal name, or sex distinction) is authorized as a category of the visitor in the change area.

The output section 22 outputs the category authorized by the normalized pattern classification section 7. In this case, the output section 7 may output the input image, the difference image, various kinds of intermediate data (the pixels of large difference value, the change area, the normalized pattern, the feature vector, the input subspace), or the dictionary subspace of each category if necessary.

Next, the image pattern recognition apparatus according to a second embodiment of the present invention is explained. In the second embodiment, an image including the recognition object is input; a difference image is generated from the input image; and a change area is detected from the difference image. Then, the change area is normalized; input data (parameter) is generated from the normalized image; and a similarity between the input data and a dictionary data registered is calculated. In this way, the normalized pattern is classified into a predetermined category.

Especially, the image pattern recognition apparatus is applied to an amusement park of a gate apparatus to manage a visitor under an environment of illumination change such as indoor of window side or outdoor of a sunshade. In the same way as in the first embodiment, only one person can pass through the gate at one time. Therefore, the facial image of the person entering into the gate is recognized, and sex distinction and age of visitors are counted using the recognition result.

Figure 7:
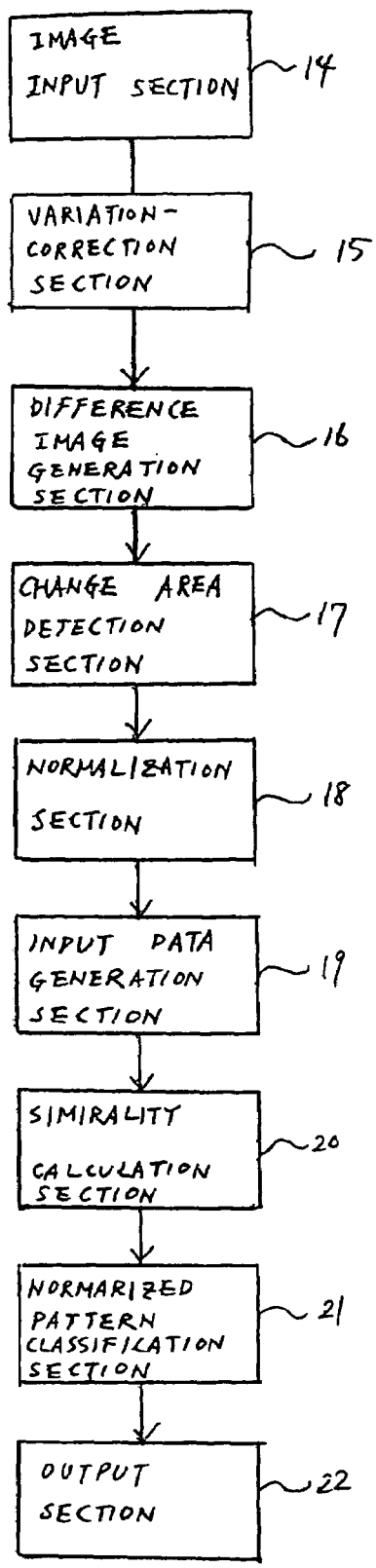
FIG. 7 is a block diagram of the image processing apparatus according to a second embodiment of the present invention.

FIG. 7 is a block diagram of the image pattern recognition apparatus according to the second embodiment. The image pattern recognition apparatus includes an image input section 14, a variation correction section 15, a difference image generation section 16, a change area detection section 17, a normalization section 18, an input data generation section 19, a similarity calculation section 20, a normalized pattern classification section 21, and an output section 22.

The image input section 14 periodically inputs an image of reflected intensity. In the same way as in the first embodiment, as shown in FIGS. 4 and 5, the TV camera 9 represents an angle of elevation in order to capture a facial image of a person 11 passing through the gate 10 from a slant lower position. As a result, the view of TV camera 9 includes a face of one person only. If no person is passing through the gate 10, the view of TV camera 9 includes a ceiling only.

The variation-correction section 15 eliminates a low frequency element affected by illumination in order to remain a high frequency element in reflected intensity image. In this case, the variation-correction section 15 generates a variation-corrected image by using a high-pass filter for the reflected intensity image. As a method to realize the high-pass filter, the input image is differentiated. As a differentiation processing, a differential operator is scanned on the image, and a weighted sum of intensity value between a center pixel of the operator and neighboring pixels is calculated as a differential value of the center pixel. As other differentiation processing, embossing processing as pixel representation method is used. In the embossing processing, an image is overlapped with the same image shifted by one pixel, and a difference of intensity value of the same pixel position between the overlapped images is calculated as the intensity value of the pixel position of the embossed image. The embossing processing is regarded as a differential processing of one direction using an extremely small differential operator of one dimension. This processing is executed by only subtraction of intensity value of pixel and is faster than weighted sum calculation of general differential operator. Especially, the embossing processing by shifting of one pixel functions as the high-pass filter to extract the highest frequency element in the reflected intensity image. As a direction to shift the image, a direction perpendicular to an edge direction representing feature of extraction object is most effective. In this case, the variation-corrected image sufficiently includes the feature of extraction object and excludes the effect of illumination change. For example, a human face includes horizontal edges such as eyebrow, eye, and mouth. Therefore, a perpendicular direction (vertical axis direction on the face) is effective.

The difference image generation section 16 calculates an absolute value of difference of each pixel value between the variation-corrected image and the background image (the ceiling image) and generates a difference image of which the absolute value is corresponding pixel value. The change area detection section 17 binarizes each pixel value of the difference image by a threshold and extracts the pixels of large difference value. The pixels of large difference value represent the recognition object (visitor) in the view area. Therefore, one circumscribed rectangle including the pixels of large difference value is regarded as an area of the visitor into the gate, and an inner area of the rectangle is extracted as the change area. As a result, the variation-corrected image of the ceiling or the person is not largely effected even if the illumination environment changes. Therefore, the change area stably includes one person only. The change area is not limited to the circumscribed rectangle and may be a general circumscribed figure.

In case of detecting the change area, the difference image generation section 16 may generate a temporal subtraction image between two images of which input timings are different. In short, by the location of TV camera 9 shown in FIGS. 4 and 5, only one person's area is extracted as the change area.

The normalization section 18 normalizes the change area detected by the change area detection section 17 as predetermined size and generates a normalized image consisted of N pixels.

The input data generation section 19 regards each normalized image as N-dimensional feature vector while the visitor is included in the view area, and serially stores a predetermined number of the feature vectors. Then, the normalization section 4 calculates eigenvector by KL-expansion of the feature vector, and generates a subspace whose base vector is the eigenvector. In this way, the subspace is regarded as the input data.

The similarity calculation section 20 calculates a similarity between the subspace (input data) and a dictionary subspace of each classified category. This calculation is repeatedly executed as a number of classified category.

The normalized pattern classification section 21 selects one category of the dictionary subspace whose similarity is highest above a threshold. This selected category (personal name, or sex distinction) is authorized as a category of the visitor in the change area.

The output section 22 outputs the category authorized by the normalized pattern classification section 21. In this case, the output section 22 may output the input image, the difference image, various kinds of intermediate data (the pixels of large difference value, the change area, the normalized pattern, the feature vector, the input subspace), or the dictionary subspace of each category if necessary.

In the first and second embodiments, in case the background for the person is regarded as a wall, a TV camera may be located at a slant side direction. In short, it is necessary that viewing volume of TV camera does not a walking direction of the recognition object (person). Furthermore, in the first and second embodiments, the image processing apparatus is applied to a management of a person entering into the gate. However, this apparatus may be applied to a traffic monitoring system to count a kind of traffic vehicles under an environment of illumination change.

Figure 8:
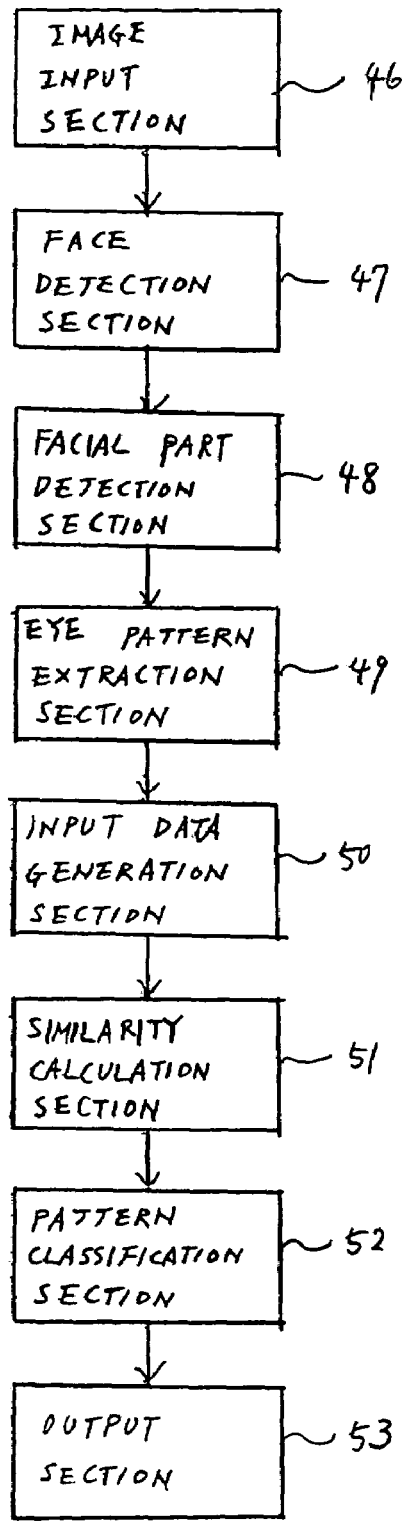
FIG. 8 is a block diagram of the image processing apparatus according to a third embodiment of the present invention.

Next, a gaze direction recognition apparatus according to a third embodiment of the present invention is explained. In the gaze direction recognition apparatus, pupil area of a person is extracted from the facial image, and a gaze direction of the person is recognized from the pupil area. FIG. 8 is a block diagram of the gaze direction recognition apparatus of the third embodiment. The gaze direction recognition apparatus includes an image input section 46, a face detection section 47, a facial part detection section 48, an eye pattern extraction section 49, an input data generation section 50, a similarity calculation section 51, a pattern classification section 52, and an output section 53.

The image input section 46 such as a TV camera inputs an image of a person as a recognition object. This input image is digitized by an A/D converter and supplied to the face detection section 47. As shown in FIG. 1, a direction of optical axis of TV camera represents an angle of elevation from the horizontal direction perpendicular to a vertical axis passing through a head of the person. By this location of TV camera, the facial part detection section 48 easily extracts the eye pupil's area without effect of eyelid and easily extracts nostrils. In this way, a plurality of facial parts are obtained from the input image, and a relative position among the plurality of facial parts is arranged. The face detection section 47 detects a face area of the person from the input image. In the third embodiment, a relative value is calculated by shifting a standard face image (template) previously registered on the input image, and an area whose relative value is highest above a threshold is extracted as the face area. If the relative value is not above the threshold, the face area does not exist in the image. In order to cope with various direction of face, if a plurality of templates based on multiple similarity method is used, the face area is more stably extracted.

The facial part detection section 48 extracts a pupil candidate from the face area by using a separability filter disclosed in Japanese Patent Disclosure (Kokai) PH9-251534. In this case, it takes a long time to process the entire face area. Therefore, only pixels whose intensity degree is below the threshold are processed in the image. This threshold is automatically determined from intensity distribution of the face area by mode method. Furthermore, a plurality of separability filters of various size are applied in order to cope with a change in the pupil's size. A particular size of the separability filter whose output value is maximum is regarded as a size of the pupil, and the output value is the relative value from this area. After this processing of the face area, this face area is smoothed by a Gaussian filter, and the local maximum point is extracted from the face area as the pupil candidate. Furthermore, the pupil is selected from these candidates by a predetermined evaluation function. The eye pattern extraction section 49 extracts an area including the eye (eye pattern) based on position data of the facial part extracted by the facial part detection section 48. The input data generation section 50 generates input data from the eye pattern extracted by the eye pattern extraction section 49. Concretely, filtering processing (for example, edge detection) is executed for normalized eye pattern image, and feature vector as the input data is generated.

Figure 9:
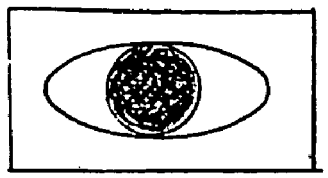
FIG. 9 is a schematic diagram of a plurality of pupil patterns corresponding to each view direction.
Figure 9:
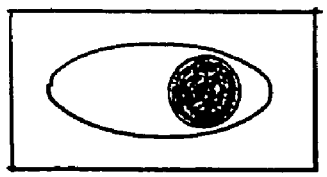
Figure 9:
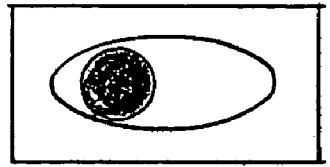
Figure 9:
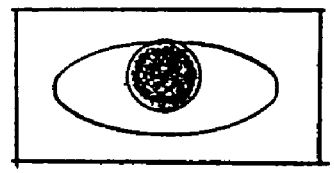
Figure 9:
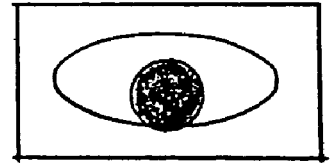

The similarity calculation section 51 calculates a similarity between the feature vector and a dictionary image of pupil of each view direction. FIG. 9 is schematic diagram of the dictionary image of pupils of each view direction. As shown in FIG. 9, each pupil dictionary image corresponds to predetermined view direction.

The pattern classification section 52 selects one gaze direction of the dictionary image whose similarity is maximum above a threshold from the similarities of all dictionary images. This selected gaze direction (For example, upper, lower, left, right) is authorized as the gaze direction (view position) of the object person. The output section 53 outputs a result of gaze direction. If necessary, a detection result of the face area or the pupil may be outputted.

Figure 10:
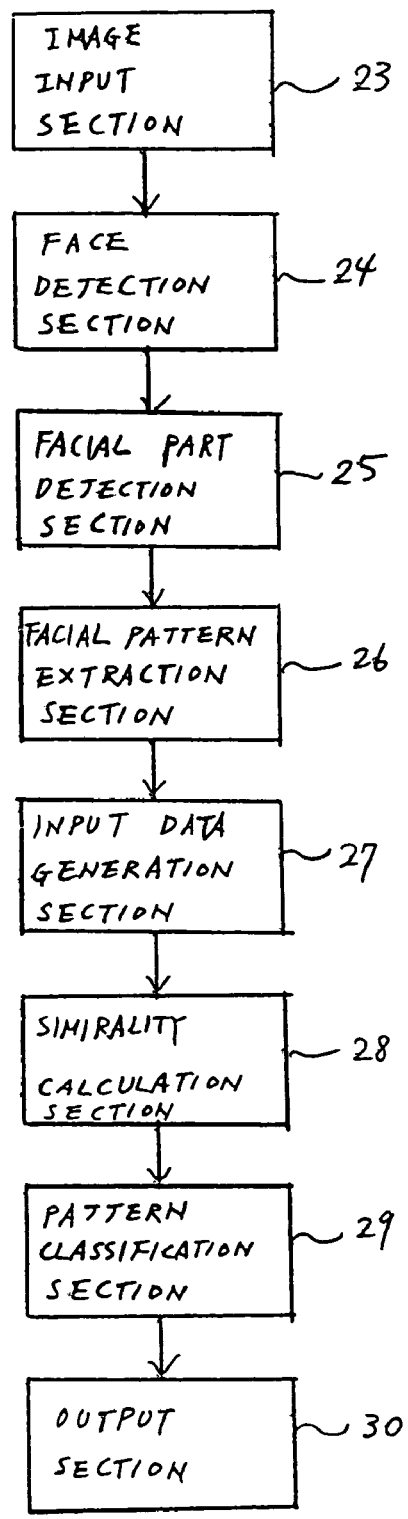
FIG. 10 is a block diagram of the image processing apparatus according to a fourth embodiment of the present invention.
Figure 11:
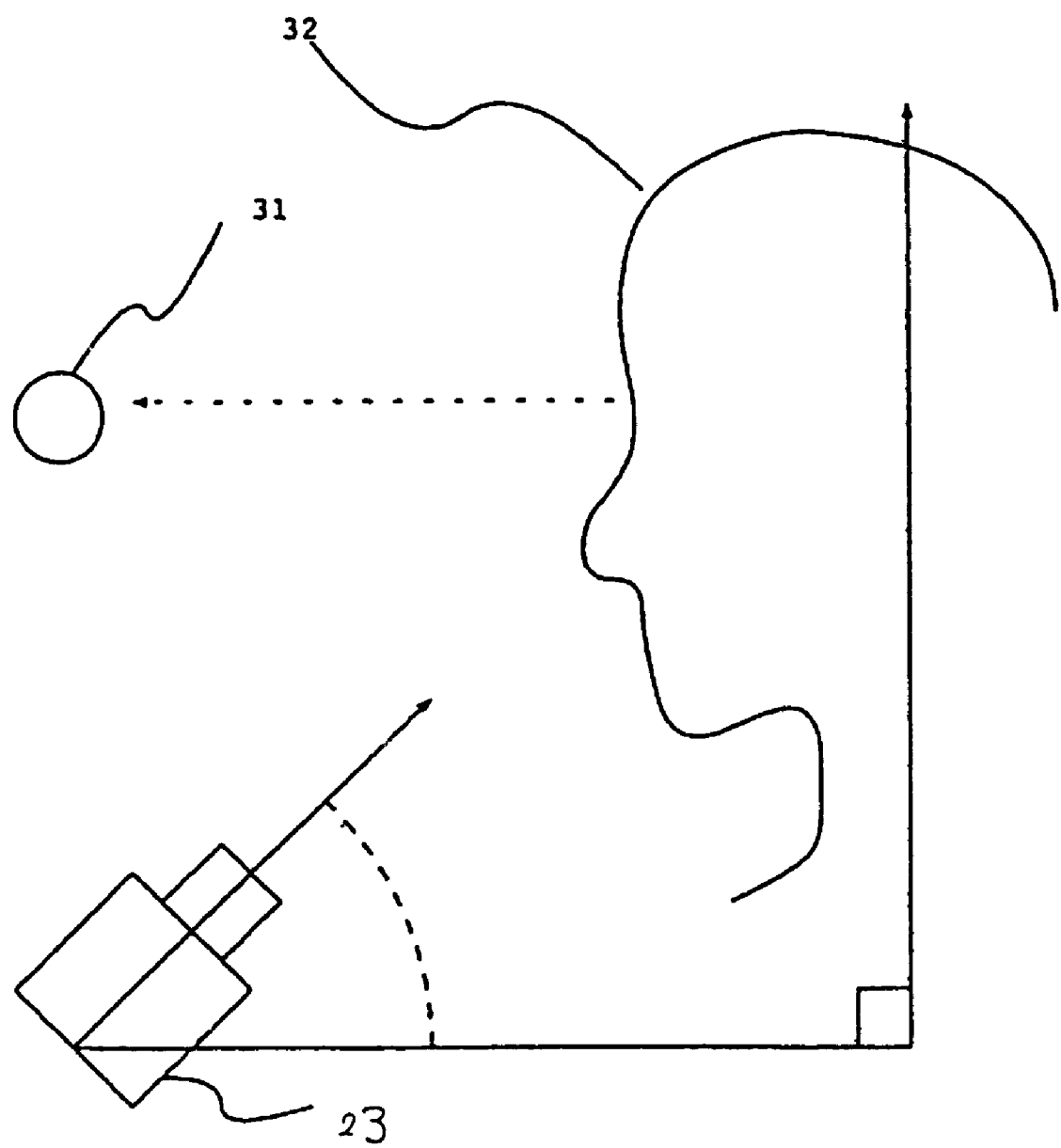
FIG. 11 is a schematic diagram showing the location among the camera means, the target means, and a user in the fourth embodiment.

Next, a person recognition apparatus according to a fourth embodiment is explained. FIG. 10 is a block diagram of the person recognition apparatus of the fourth embodiment. The person recognition apparatus includes an image input section 23, a face detection section 24, a facial part detection section 25, an eye pattern extraction section 26, an input data generation section 27, a similarity calculation section 28, a pattern classification section 29, and an output section 30. The image input section 23 such as a TV camera inputs an image of a person as a recognition object. This input image is digitized by an A/D converter and supplied to the face detection section 24. As shown in FIG. 11, a direction of optical axis of TV camera 23 represents an angle of elevation for a horizontal direction perpendicular to a vertical axis passing through a head of the person. The TV camera 23 is located at lower position than a position of nostrils of the person 32.

According to variation of characteristic of person, winding of front and rear of the head and limit of detection of facial parts, the angle of elevation of TV camera is set as "20°~60°". By this camera location, the facial part extraction section 25 easily extracts the nostrils as the facial part. Furthermore, as shown in FIG. 11, by location of a target object 31, it is protected that the user watches undesired direction. As the target object 31, for example, a CRT display viewable by the user, a liquid crystal display of which view area is limited to predetermined direction (narrow view area), a mark such as character, sign and figure to lead the user's attention, a mirror to reflect the user, or another camera to input a frontal face image of the user, may be selectively used.

The face detection section 24 detects a face area of the person from the input image. In the fourth embodiment, a relative value is calculated by shifting a standard face image (template) previously registered on the input image, and an area whose relative value is highest above a threshold is extracted as the face area. If the relative value is not above the threshold, the face area does not exist in the image. In order to cope with various direction of face, if a plurality of templates based on multiple similarity method is used, the face area is more stably extracted.

The facial part detection section 25 extracts a pupil candidate from the face area by using a separability filter disclosed in Japanese Patent Disclosure (Kokai) PH9-251534. In this case, it takes a long time to process the entire face area. Therefore, only pixels whose intensity degree is below the threshold are processed in the image. This threshold is automatically determined from intensity distribution of the face area by a mode method. Furthermore, a plurality of separability filters of various size are applied in order to cope with change of facial part's size. A particular size of the separability filter whose output value is maximum is regarded as a size of facial part, and the output value is the relative value from this area. After this processing of the face area, this face area is smoothed by a Gaussian filter, and the local maximum point is extracted from the face area as the candidate of facial part. Furthermore, the facial part is selected from these candidates by a predetermined evaluation function.

The facial pattern extraction section 26 extracts a normalized facial pattern according to position data of the facial part detected by the facial part detection section 25. The input data generation section 27 generates input data from the facial pattern extracted by the facial pattern extraction section 26. Concretely, a subspace as the input data is generated from a plurality of normalized facial image patterns. The similarity calculation section 28 calculates a similarity between the subspace and a dictionary subspace of each category previously registered. The pattern classification section 29 selects one category of the dictionary subspace whose similarity is highest above a threshold. This selected category (personal name, or sex distinction) is authorized as a category of the person 32. The output section 30 outputs the classification result of pattern. If necessary, detection result of the face area or the facial part may be outputted.

Figure 12:
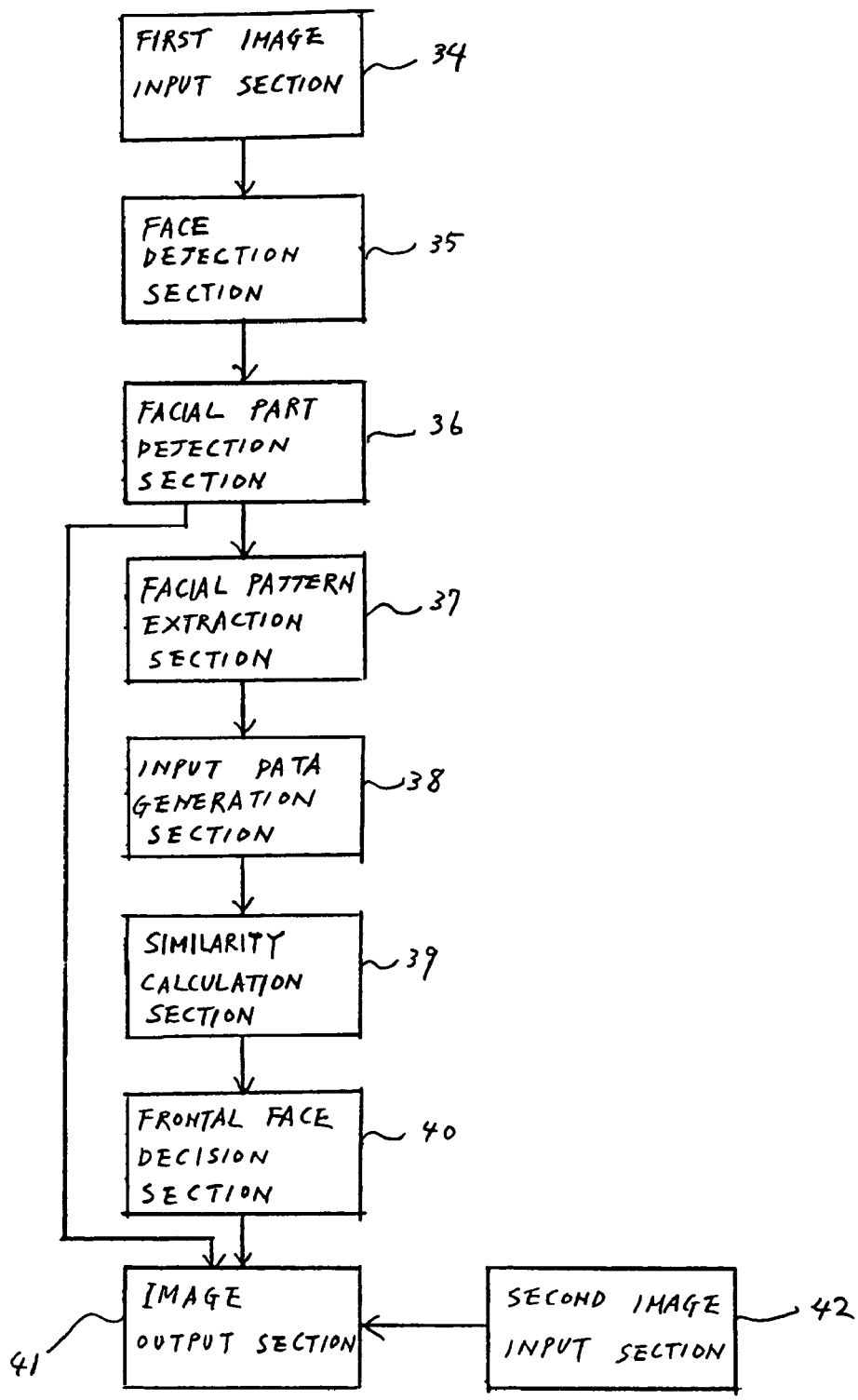
FIG. 12 is a block diagram of the image processing apparatus according to a fifth embodiment of the present invention.
Figure 13:
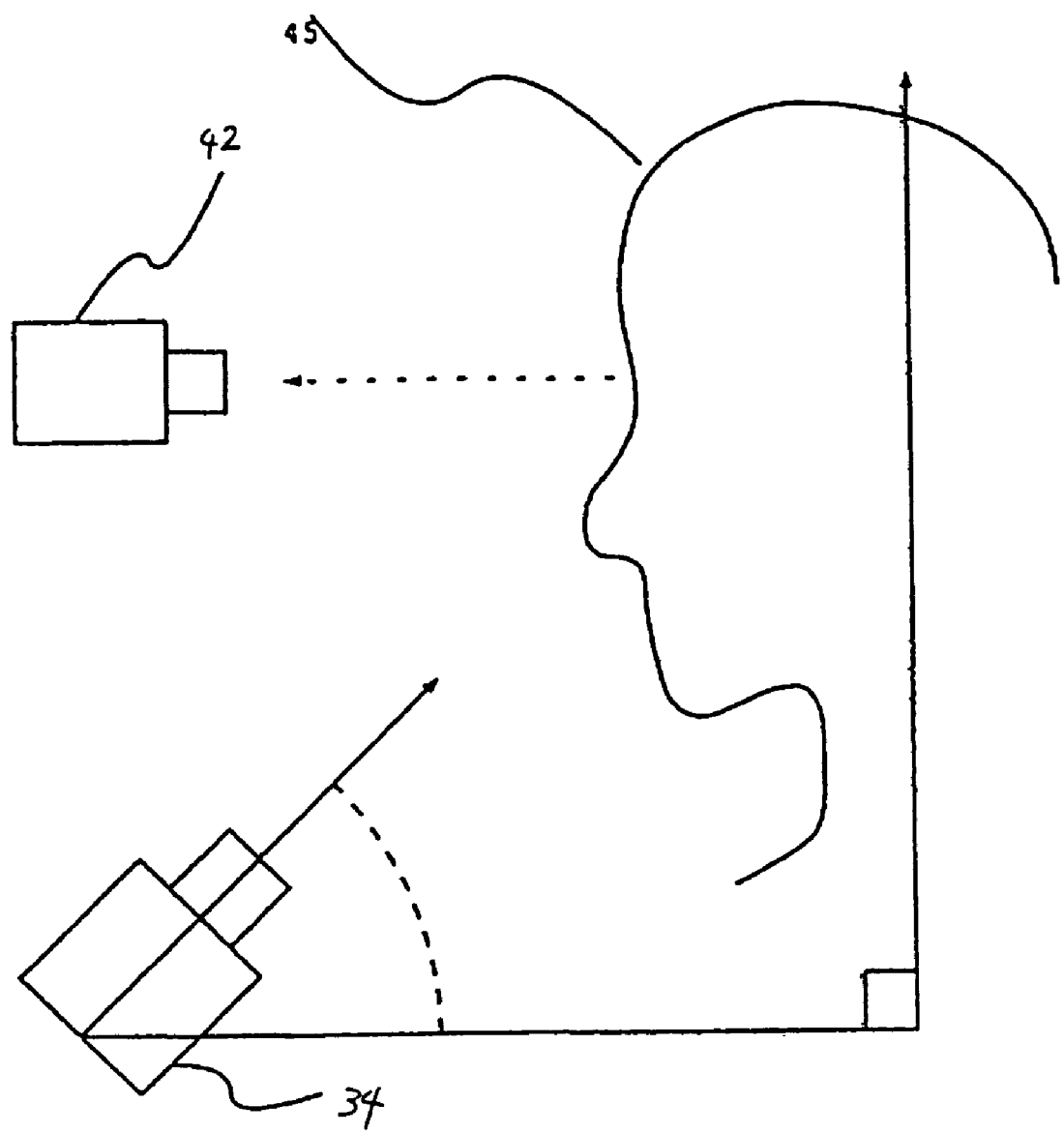
FIG. 13 is a schematic diagram showing the location among the camera means, the target means, and the user in the fifth embodiment.

Next, a face image input apparatus according to a fifth embodiment is explained. FIG. 12 is a block diagram of the face image input apparatus of the fifth embodiment. The face image input apparatus includes a first image input section 34, a face detection section 35, a facial part detection section 36, a face pattern extraction section 37, an input data generation section 38, a similarity calculation section 39, a frontal face decision section 40, an image output section 41, and a second image input section 42. The first image input section 34 such as a TV camera inputs an image of a person as a recognition object. This input image is digitized by an A/D converter and supplied to the face detection section 35. As shown in FIG. 13, a direction of optical axis of TV camera 34 represents an angle of elevation from the horizontal direction perpendicular to a vertical axis passing through a head of the person 45. This image is used for detection of the facial part and decision of the frontal face explained afterward. In general TV camera, the angle of elevation is desirably set as "20°~60°". By this camera location, the facial part extraction section 36 easily extracts the nostrils as the facial part. Furthermore, as shown in FIG. 13, the second image input section 42 such as another TV camera is set as a target object to keep the gaze direction of the person 45. In this case, the person does not watch the first TV camera 34 located at lower position, but the person watches the second TV camera 42 located at front position.

The face detection section 35 detects a face area of the person from the input image supplied by the first image input section 34. In the fifth embodiment, a relative value is calculated by shifting a standard face image (template) previously registered on the input image, and an area whose relative value is highest above a threshold is extracted as the face area. If the relative value is not above the threshold, the face area does not exist in the image. In order to cope with various directions of a face, if a plurality of templates based on multiple similarity method are used, the face area is more stably extracted.

The facial part detection section 36 extracts facial part candidates (pupil, nostril) from the face area by using a separability filter disclosed in Japanese Patent Disclosure (Kokai) PH9-251534. In this case, it takes a long time to process the entire face area. Therefore, only pixels whose intensity degree is below the threshold are processed in the image. This threshold is automatically determined from an intensity distribution of the face area by a mode method. Furthermore, a plurality of separability filters of various size are applied in order to cope with a change of facial parts size. A particular size of the separability filter whose output value is maximum is regarded as a size of facial part, and the output value is the relative value from this part. After this processing of the face area, this face area is smoothed by Gaussian filter, and the local maximum point is extracted from the face area as the facial part candidate. Furthermore, the facial part is selected from these candidates by predetermined evaluation function. If two pupils are included in the facial parts, the facial part detection section 36 decides that the person's eyes are open and sends a detection signal of the open eye status.

The facial pattern extraction section 37 extracts a normalized facial pattern based on a position of the facial part obtained by the facial part detection section 36. The input data generation section 38 generates the input data from the facial pattern extracted by the facial pattern detection section 36. Concretely, feature vector as the input data is generated from the normalized facial image pattern. The similarity calculation section 39 calculates a similarity between the feature vector and a dictionary subspace of frontal face previously registered. This frontal face corresponds to a first image input from the first image input section 34 in case the second image input section 42 inputs a second image of frontal face at the same input timing as the first image. If the similarity is above a threshold, the frontal face decision section 40 decides that the person's face image is a frontal face image and sends a frontal face detection signal to the image output section 41. As shown in FIG. 13, the second image input section 42 such as a TV camera is located at front position of the person 45 in order to keep the person's gaze direction. The second image input section 42 continually inputs a face image of the user, and sends the face image to the image output section 41. If the image output section 41 receives the open eye status detection signal and the frontal face detection signal for the same first image, the image output section 41 outputs the second image inputted at the same timing as the first image.

In the fifth embodiment, a TV camera is used as the second image input section 42. However, a digital camera may be used. In this case, image data from the digital camera whose input timing is equal to the first input image from which both the open eye status detection signal and the frontal face detection signal are sent is outputted. Furthermore, if a shutter timing of camera coincides with input timing of the first image from which the open eye status detection signal and the frontal face detection signal are sent, a regular camera may be used as the second image input section 42. By above-mentioned processing of the fifth embodiment, the person's face image of frontal face and opening eyes is only outputted.

In the present invention, the feature of the input data and a calculation method of the similarity are not limited to the above-mentioned examples. They may be executed in various other ways.

As mentioned-above, in the present invention, the camera inputs the face image by looking up toward the person from a lower position. Therefore, the person's face is certainly recognized. As a result, the identification of the person, the detection of the person's gaze direction, and input of the frontal face image are stably executed.

A memory can be used to store instructions for performing the process described above. The process may be performed with the aid of a general purpose computer or microprocessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An image processing apparatus, comprising:
a first camera for inputting a first image of a face of a person to be recognized;
a second camera for inputting a second image of the face of the person;
face detection means for detecting a face area from the first image;
frontal face decision means for deciding whether the second image is a frontal face of the person by referring to the face area;
open eyes detection means for detecting a state of open eyes from the face area; and
image output means for outputting the second image inputted while the second image is decided to be the frontal face and the state of open eyes is detected;
wherein a direction from a view position of the second camera to a center position of the face of the person is a facial front direction, and
wherein a view position of the first camera is located lower than a position of the face of the person, and a direction of the optical axis of the first camera represents an angle of elevation from a horizontal direction.

2. The image processing apparatus according to claim 1, wherein the angle of elevation of the first camera is 20°~60° so that the first camera inputs the image including both pupils and both nostrils of the face of the person, and
wherein the second camera includes a target object to lead the person's gaze direction.

3. The image processing apparatus according to claim 2, wherein said open eyes detection means supplies an open eyes state detection signal to said image output means if said open eyes detection means detects two pupils from the face area.

4. The image processing apparatus according to claim 3, wherein said frontal face detection means calculates a similarity between the face area and a dictionary pattern of a frontal face as the first image, and supplies a frontal face detection signal to said image output means if the similarity is above a threshold.

5. The image processing apparatus according to claim 4, wherein said image output means outputs the second image whose input timing is equal to the first image from which the state detection signal and the frontal face detection signal are supplied.

6. A method for processing an image, comprising the steps of:
inputting a first image of a face of a person to be recognized using a first camera;
inputting a second image of the face of the person using a second camera;
detecting a face area from the first image;
deciding whether the second image is a frontal face of the person by referring to the face area;
detecting a state of open eyes from the face area; and
outputting the second image inputted while the second image is decided to be the frontal face and the state of open eyes is detected;
wherein a direction from a view position of the second camera to a center position of the face of the person is a facial front direction, and
wherein a view position of the first camera is located lower than a position of the face of the person, and a direction of the optical axis of the first camera represents an angle of elevation from a horizontal direction.

7. A computer readable medium that stores a computer program comprising:
instruction means for causing a computer to input a first image of a face of a person to be recognized using a first camera;
instruction means for causing a computer to input a second image of the face of the person using a second camera;
instruction means for causing a computer to detect a face area from the first image;
instruction means for causing a computer to decide whether the second image is a frontal face of the person by referring to the face area;
instruction means for causing a computer to detect a state of open eyes from the face area; and
instruction means for causing a computer to output the second image inputted while the second image is decided to be the frontal face and the state of open eyes is detected;
wherein a direction from a view position of the second camera to a center position of the face of the person is a facial front direction, and
wherein a view position of the first camera is located lower than a position of the face of the person, and a direction of the optical axis of the first camera represents an angle of elevation from a horizontal direction.

* * * * *